United States Patent
Bouhini et al.

(10) Patent No.: US 11,170,335 B2
(45) Date of Patent: Nov. 9, 2021

(54) ADAPTIVE ARTIFICIAL INTELLIGENCE FOR USER TRAINING AND TASK MANAGEMENT

(71) Applicant: Accenture Global Solutions Limited, Dublin (IE)

(72) Inventors: Chahrazed Bouhini, Dublin (IE); Medb Corcoran, Dublin (IE); Bogdan Eugen Sacaleanu, Dublin (IE); Ascanio Afan De Rivera Costaguti, Dublin (IE); Nóirín Duggan, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 347 days.

(21) Appl. No.: 16/146,254

(22) Filed: Sep. 28, 2018

(65) Prior Publication Data

US 2020/0104777 A1    Apr. 2, 2020

(51) Int. Cl.
*G06Q 10/06* (2012.01)
*G06N 20/00* (2019.01)

(52) U.S. Cl.
CPC ....... *G06Q 10/06398* (2013.01); *G06N 20/00* (2019.01); *G06Q 10/063112* (2013.01); *G06Q 10/063114* (2013.01)

(58) Field of Classification Search
None
See application file for complete search history.

(56) References Cited

U.S. PATENT DOCUMENTS

| | | | |
|---|---|---|---|
| 2003/0139956 A1* | 7/2003 | Guenther | G06Q 10/06398 705/7.13 |
| 2005/0273357 A1* | 12/2005 | Barnes | G06Q 10/0633 705/7.29 |
| 2014/0324721 A1* | 10/2014 | Rennison | G06Q 50/2057 705/321 |
| 2018/0137419 A1* | 5/2018 | Byron | G06F 40/30 |
| 2018/0137420 A1* | 5/2018 | Byron | G06N 5/04 |

(Continued)

FOREIGN PATENT DOCUMENTS

| | | |
|---|---|---|
| JP | 2007264055 A | 10/2007 |
| JP | 2018045395 A | 3/2018 |

*Primary Examiner* — Leland Marcus
(74) *Attorney, Agent, or Firm* — Harrity & Harrity, LLP

(57) ABSTRACT

An example implementation described herein involves identifying an artificial intelligence module to train a user; selecting, using the artificial intelligence module, a set of tasks from a plurality of tasks to provide to the user; providing the set of tasks to the user; monitoring a performance parameter associated with the user performing the tasks; identifying a machine learning model to determine a level of expertise of the user; determining, using the performance parameter as an input to the machine learning model, whether the level of expertise of the user satisfies an expertise threshold; obtaining a configuration update to the artificial intelligence module from the user, determining that the level of expertise of the user satisfies the expertise threshold; and updating the artificial intelligence module to use the configuration update in association with training one or more users or selecting a subsequent set of tasks from the plurality of tasks based on determining that the level of expertise of the user satisfies the expertise threshold.

20 Claims, 10 Drawing Sheets

300 ⟶

(56) References Cited

U.S. PATENT DOCUMENTS

| | | | |
|---|---|---|---|
| 2019/0087558 A1* | 3/2019 | Mercury | H04L 63/0861 |
| 2019/0087781 A1* | 3/2019 | Mercury | G06Q 10/06393 |
| 2019/0089701 A1* | 3/2019 | Mercury | G06F 16/285 |
| 2019/0164110 A1* | 5/2019 | Shiraishi | G06N 3/08 |

* cited by examiner

ADAPTIVE ARTIFICIAL INTELLIGENCE FOR USER TRAINING AND TASK MANAGEMENT

BACKGROUND

Artificial intelligence refers to intelligence that may be performed by a machine. For example, artificial intelligence may involve the machine receiving information, learning from the information, and taking appropriate action based on the information to achieve one or more goals. Artificial intelligence may include and/or be associated with one more models, such as classification models, data analysis models, machine learning models, deep learning models, and/or the like.

SUMMARY

According to some implementations, a method may include identifying an artificial intelligence module to train a user; selecting, using the artificial intelligence module, a first set of tasks from a plurality of tasks to provide to the user; providing the first set of tasks to the user; monitoring a plurality of performance parameters associated with the user performing the first set of tasks; identifying a machine learning model to determine a level of expertise of the user; determining, using the plurality of performance parameters as inputs to the machine learning model, that the level of expertise of the user does not satisfy an expertise threshold; selecting using the artificial intelligence module and based on determining that the level of expertise of the user does not satisfy the expertise threshold, a second set of tasks from the plurality of tasks to provide to the user; providing the second set of tasks to the user; monitoring the plurality of performance parameters associated with the user performing the second set of tasks; determining, using the plurality of performance parameters as input to the machine learning model, that the level of expertise of the user satisfies the expertise threshold; obtaining a configuration update to the artificial intelligence module from the user; and updating the artificial intelligence module to use the configuration update in association with training one or more users, wherein the artificial intelligence module is updated based on the level of expertise of the user satisfying the expertise threshold.

According to some implementations, a device may include one or more memories and one or more processors, communicatively coupled to the one or more memories, to: identify an artificial intelligence module to train a user; select, using the artificial intelligence module, a set of tasks from a plurality of tasks to provide to the user; provide the set of tasks to the user; monitor a biometric of the user while the user is performing the set of tasks; monitor a performance metric associated with the user performing the set of tasks; identify a machine learning model to determine a level of expertise of the user; determine, using the biometric and the performance metric as inputs to the machine learning model, whether the level of expertise of the user satisfies an expertise threshold; obtain a configuration update to the artificial intelligence module from the user; and when the level of expertise of the user is determined to satisfy the expertise threshold, update the artificial intelligence module to use the configuration update in association with training one or more users or selecting a subsequent set of tasks from the plurality of tasks.

According to some implementations, a non-transitory computer-readable medium may store instructions that, when executed by one or more processors, cause the one or more processors to: identify an artificial intelligence module to train a user; select, using the artificial intelligence module, a set of tasks from a plurality of tasks to provide to the user; provide the set of tasks to the user; monitor a performance parameter associated with the user performing the tasks; identify a machine learning model to determine a level of expertise of the user; determine, using the performance parameter as an input to the machine learning model, whether the level of expertise of the user satisfies an expertise threshold, wherein the expertise threshold is dynamically updated by the machine learning model based on performances associated with the plurality of tasks; obtain a configuration update to the artificial intelligence module from the user; determine that the level of expertise of the user satisfies the expertise threshold; and update the artificial intelligence module to use the configuration update in association with training one or more users or selecting a subsequent set of tasks from the plurality of tasks based on determining that the level of expertise of the user satisfies the expertise threshold.

DETAILED DESCRIPTION

Figure 1:
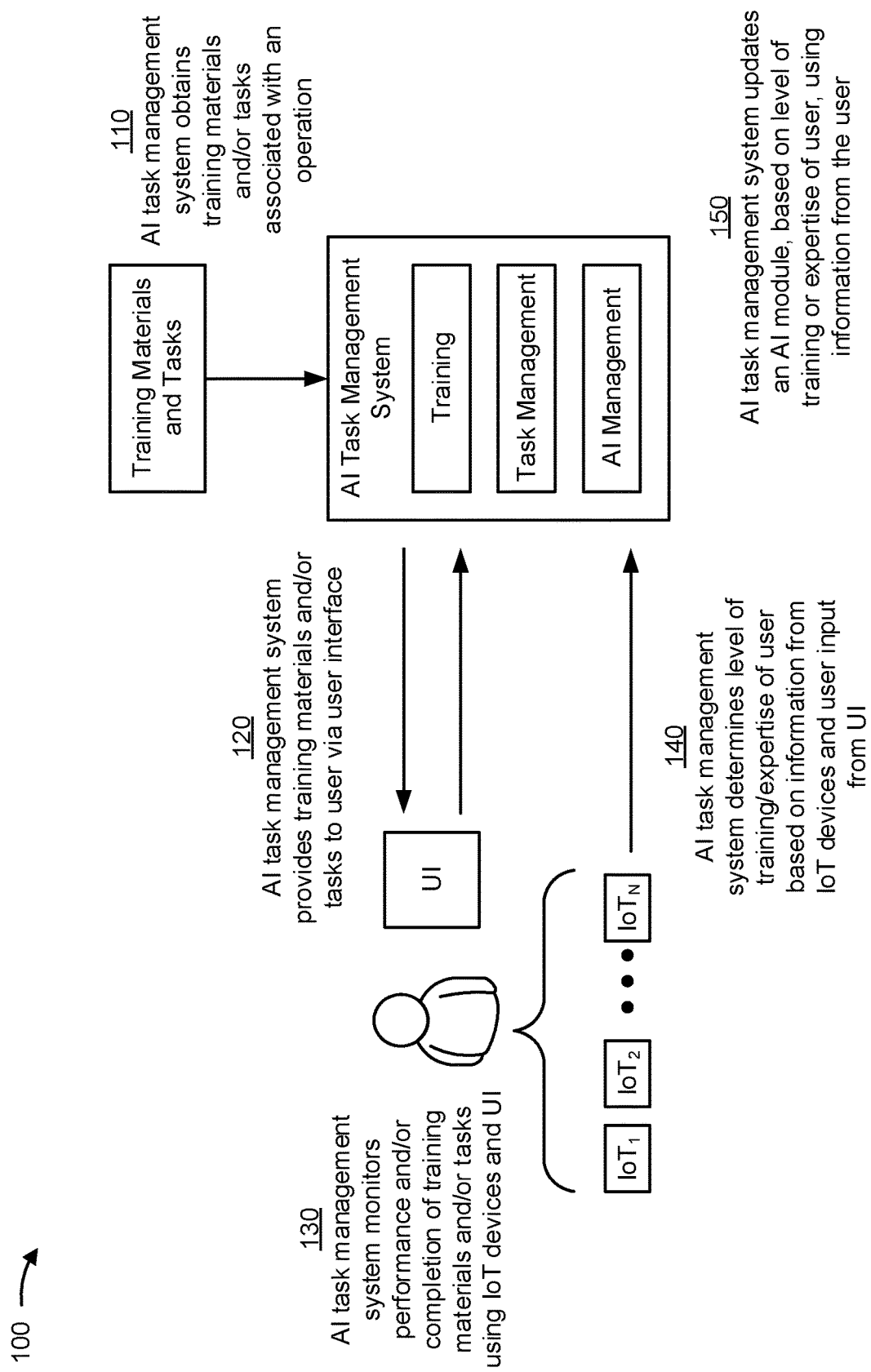
FIG. 1 is a diagram of an example implementation described herein.

The following detailed description of example implementations refers to the accompanying drawings. The same reference numbers in different drawings may identify the same or similar elements.

In some instances, an organization (or an individual) may embed artificial intelligence into processes associated with performing operations. For example, the artificial intelligence may be used in association with performing particular tasks (e.g., employment-related tasks, education-related tasks, and/or the like) associated with the operations. However, in some instances, an overreliance on artificial intelligence may prevent the organization from being flexible and/or cause the organization to be unable to adjust quickly enough to an environment and/or a competitive landscape of the organization.

Some examples described herein provide an artificial intelligence task management system that can be collaborative with a user to enable the artificial intelligence task management system to adapt according to information from the user once the user reaches a particular level of expertise. In some implementations, the artificial intelligence task management system may be used to train the user and/or monitor performance of tasks by the user until the artificial intelligence task management system determines that the user has the particular level of expertise. Once the artificial intelligence task management system determines that the user has the particular level of expertise, the user may be able (e.g., via a user input and/or feedback) to reconfigure, update, and/or adjust one or more configurations of the artificial intelligence task management system. In some implementations, the artificial intelligence task management system may automatically learn and/or identify feedback from a user that is identified as having a threshold level of expertise and may adjust a configuration and characteristics of tasks based on information and performances of that user. According to some implementations, one or more knowledge graphs, representative of the level of expertise of the user and/or the artificial intelligence task management system, may be used to track progress associated with the user (e.g., training progress, task performance progress, and/or the like) and/or the artificial intelligence task management system (e.g., knowledge, settings, actions, and/or the like). In some implementations, one or more monitoring devices (e.g., Internet of Things (IoT) devices, sensors, cameras, microphones, and/or the like) may be used to monitor a user's training and/or performance of tasks. In such cases, the artificial intelligence task management system may determine whether the user has sufficient understanding of training material (e.g., by completing training materials according to particular performance metrics) and/or has a particular level of expertise based on information received from the monitoring devices.

Accordingly, as described herein, an artificial intelligence task management system (e.g., using one or more machine learning models) may monitor a user learning a particular subject matter and/or performing tasks associated with the particular subject matter to determine a level of expertise of the user. Once the artificial intelligence task management system determines that the level of expertise of the user satisfies a threshold (e.g., a threshold that the artificial intelligence task management system determined from a knowledge graph and/or a multi-criteria optimization analysis), the artificial intelligence task management system may use configuration updates from the user to update a configuration of the artificial intelligence task management system. In this way, some implementations described herein may conserve processor resources and/or memory resources that would otherwise be spent by an artificial intelligence task management system attempting to reconfigure and/or adjust without support and/or information from a user determined to have a threshold level of expertise (e.g., adjustments may be made from inputs of a user that do not satisfy the threshold level of expertise, or may not be adjusted according to any user feedback). Furthermore, some implementations, described herein, can conserve processor resources and/or memory resources associated with correcting one or more actions performed by a previous artificial intelligence task management system that was not reconfigured or could not be reconfigured, as described herein.

In this way, several different stages of a process for adapting an artificial intelligence task management system according to a determined level of expertise of a user associated with the artificial intelligence task management system are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to adapt an artificial intelligence task management system according to a level of expertise of a user associated with the artificial intelligence task management system. Finally, automating the process for adapting the artificial intelligence task management system, as described herein, conserves computing resources (e.g., processor resources, memory resources, and/or the like) that would otherwise be wasted in attempting to perform one or more actions that may otherwise not be possible without adapting the artificial intelligence task management system, and/or computing resources that would be wasted by being unable to determine whether the artificial intelligence task management system can be updated or should be updated according to the level of expertise of a user associated with the artificial intelligence task management system.

FIG. 1 is a diagram of an example implementation 100 described herein. The example implementation 100 of FIG. 1 includes a training and/or task management system that includes an artificial intelligence task management system, as described herein. In the example of FIG. 1, a user may be associated with and/or may use the artificial intelligence task management system to learn a particular subject matter using one or more training materials, perform tasks associated with the subject matter, and/or update an artificial intelligence module of the artificial intelligence task management system. The artificial intelligence task management system may provide the training materials and/or tasks to the user and monitor the user using one or more monitoring devices (shown as $IoT_1$–$IoT_N$, where N is an integer greater than 1). The artificial intelligence task management system may reconfigure an artificial intelligence module according to information received from the user when the user has a threshold level of expertise (which may be referred to herein as an expertise threshold) associated with the subject matter and/or associated with performing tasks. The threshold level of expertise may be a dynamic threshold that is updated during and/or based on training and/or task management analyses of user performances. For example, a machine learning model may dynamically update and/or adjust the threshold level of expertise based on performances associated with performing one or more of the tasks (e.g., performances of other users, performances of the user, and/or the like).

In some implementations, as described herein, the artificial intelligence task management system may be specific to one user, to a particular group of users (e.g., users in a particular department or organization), and/or to any number of users (e.g., any number of users that have used or interacted with the artificial intelligence task management system). Accordingly, the artificial intelligence task management system may be one of a plurality of artificial intelligence task management systems that can be selected according to one or more characteristics of a user (e.g., one or more demographics of the user, an experience level of the user, a background of the user, a training level of the user, a level of expertise of the user, an organization associated with the user, and/or the like). In some implementations, a machine learning model can be trained to select the artificial intelligence task management system for a particular user, using the characteristics of the user as inputs. Historical data associated with selecting an artificial intelligence task management system for the user and/or for one or more other users may be used to select the artificial intelligence task management system. Therefore, the artificial intelligence task management system may be selected based on characteristics of the user and/or historical data associated with selecting artificial intelligence task management systems for other users.

As shown in FIG. 1, and by reference number 110, the artificial intelligence task management system obtains training materials and/or tasks associated with an operation. For example, the artificial intelligence task management system may obtain the training materials and/or tasks from a data structure that stores the training materials and/or the tasks. The training materials may be information associated with exercises, simulations, and/or scenarios designed to train the user on a particular subject (e.g., an area of expertise, an activity corresponding to the user's employment with an organization, tools associated with performing one or more tasks, and/or the like). The tasks may correspond to one or more operations and/or activities that are to be performed by the user (e.g., as part of the user's employment with an organization, as part of the user's education, and/or the like). In some implementations, the data structure may be updated and/or provided with training materials and/or tasks by another system and/or by a user. Additionally, or alternatively, the data structure may be provided with the training materials and/or tasks by the artificial intelligence task management system. For example, the artificial intelligence task management system may use machine learning to train a model (e.g., a machine learning model) to update and/or insert training materials and/or tasks into the data structure. In such a case, training materials, tasks, and/or performance metrics from one or more users may be used as inputs to the model. The model may update the data structure to include new training materials based on the inputs.

In some implementations, a machine learning model (e.g., a training model) may be used to select or obtain training materials from the data structure based on one or more parameters, such as timing associated with training (e.g., a time of day, week, month, year, and/or the like), a schedule of the user, an amount of training that the user has received, the training materials that the user has accessed, the training materials that the user has completed, user input from the user associated with the training materials, performance characteristics (e.g., speed, timeliness, accuracy, and/or the like) associated with completing training materials, information received from monitoring devices, and/or the like. The artificial intelligence task management system may train the machine learning model using historical data associated with selecting and/or obtaining the training materials for the user and/or for other users (e.g., using past selections and/or distributions of training materials to the user or other users). Using the historical data and the one or more parameters to select and/or obtain the training materials (e.g., using the one or more parameters as inputs to the machine learning model), the artificial intelligence task management system may select and/or obtain training materials that are to be completed by the user.

In some implementations, a machine learning model (e.g., a task management model) may be used to select or obtain tasks that are to be performed by the user, from the data structure, based on one or more parameters, such as timing associated with training (e.g., a time of day, week, month, year, and/or the like), a schedule of the user, an amount of training that the user has received, the training materials that the user has accessed, the training materials that the user has completed, performance characteristics (e.g., speed, timeliness, accuracy, and/or the like) associated with completing training materials, user input from the user associated with the training materials, tasks that have been performed by the user, tasks that have been completed by the user, types of tasks that have been performed or completed by the user, performance characteristics (e.g., speed, timeliness, accuracy, and/or the like) associated with performing the tasks, user input from the user associated with performing the tasks, information received from the monitoring devices, and/or the like. The artificial intelligence task management system may train the machine learning model using historical data associated with selecting and/or obtaining the tasks for the user and/or for other users (e.g., using past selections and/or distributions of tasks to the user or other users). Using the historical data and the one or more parameters to select and/or obtain the tasks (e.g., using the one or more parameters as inputs to the machine learning model), and/or dynamically computed or estimated performances of tasks that are iteratively updated (e.g., based on varying characteristics of the tasks), the artificial intelligence task management system may select and/or obtain training materials that are to be completed by the user.

According to some implementations, training materials and/or tasks may be iteratively selected by the artificial intelligence task management system based on progress of the user completing the training materials and/or tasks. For example, after the artificial intelligence task management system determines that a first set of training materials, that were previously selected, are completed by the user, the artificial intelligence task management system may obtain a second set of training materials that are to be completed by the user. Similarly, after the artificial intelligence task management system determines that a first set of tasks, that were previously selected, are completed by the user, the artificial intelligence task management system may obtain a second set of tasks that are to be completed by the user. In some implementations, the artificial intelligence task management system may not select and/or obtain tasks from the data structure until a threshold level of training materials (e.g., 80%, 90%, 100%, and/or the like) have been completed within a threshold level of performance metrics (e.g., at a threshold speed, within a threshold amount of time, with a threshold level of accuracy, and/or the like).

In this way, the artificial intelligence task management system may select training materials and/or tasks that are to be performed by the user to permit the artificial intelligence task management system to provide the training materials and/or tasks to the user.

As further shown in FIG. 1, and by reference number 120, the artificial intelligence task management system provides the training materials and/or tasks to the user via a user interface. For example, the artificial intelligence task management system may display the training materials on a display of the user interface (UI) to enable the user to access the training materials and/or view information about the tasks that are to be performed. According to some implementations, the artificial intelligence task management system may provide the training materials via a network or other device associated with the user interface and/or the artificial intelligence task management system.

As further shown in FIG. 1, and by reference number 130, the artificial intelligence task management system monitors performance and/or completion of the training materials and/or tasks using the monitoring devices and the user interface. Accordingly, the artificial intelligence task management system may monitor a plurality of parameters that correspond to the monitoring devices and/or user input received from the user interface. Such parameters may include timeliness to complete one of the first set of tasks or the second set of tasks, speed while performing the training associated with the training materials or while performing the tasks, a level of accuracy associated with performing the training or the tasks, an efficiency associated with performing the training and/or the tasks, a level of difficulty associated with the first set of tasks or the second set of tasks, one or more biometrics of the user, and/or the like.

According to some implementations, the monitored biometrics of the user while training and/or performing tasks may include one or more of an alertness level of the user, a stress level of the user, a concentration level of the user, and/or the like that may be measured and/or determined from the monitoring devices. For example, an alertness level may be determined based on whether the user is active (e.g., focused on the user interface, moving, and/or the like) or inactive (e.g., sleeping, moving slowly, slouching, and/or the like) by analyzing an eye gaze of the user (e.g., using a camera), detecting activity of the user while performing the tasks, detecting a posture of the user while performing the tasks, determining a heart rate level while performing the tasks (e.g., using a heart rate monitor), determining a breathing level while performing the tasks, and/or the like. A stress level may be determined using a heart rate (e.g., using a heart rate monitor) and/or movement/action of the user (e.g., using a camera) to identify whether the user is anxious and/or calm while performing the tasks. A concentration level of the user may be determined to identify whether the user is focused on the tasks or distracted using eye gaze of the user, posture of the user, whether the user is interacting with objects other than the user interface, whether the user appears to be bored and/or appears to be losing concentration while completing the task, and/or the like. The biometrics of the user may be used to determine the user's comfort level with the training material and/or the tasks, whether the user has knowledge of the subject matter of the training material, and/or whether the user has a level of expertise associated with the subject matter and/or performing the tasks. For example, if the user is able to complete relatively difficult tasks without requiring a high level of concentration and without being stressed, such parameters may indicate that the user has reached a level of expertise associated with performing those tasks.

In this way, the artificial intelligence task management system may monitor the performance and/or completion of training and/or tasks performed by the user to determine whether the user has a level of training and/or expertise to perform additional training and/or additional tasks (e.g., a next level of training or tasks with higher difficulty).

As further shown in FIG. 1, and by reference number 140, the artificial intelligence task management system determines a level of expertise of the user based on information from the monitoring devices and/or user input from the user interface. Accordingly, using performance metrics, the artificial intelligence task management system may determine whether a level of training of the user indicates that the user has sufficient knowledge of the subject matter of the training material (and is capable of performing one or more tasks) and/or whether a level of expertise satisfies a threshold level of expertise associated with performing the tasks and/or associated with having the ability to update and/or reconfigure an artificial intelligence module of the artificial intelligence task management system.

In some implementations, a machine learning model (e.g., the training model) may be used to determine a level of training of the user based on one or more of the performance metrics while performing the training, such as timing associated with training (e.g., a time of day, week, month, year, and/or the like), a schedule of the user, an amount of training that the user has done, the training materials that the user has accessed, the training materials that the user has completed, user input from the user associated with the training materials, performance characteristics (e.g., speed, timeliness, accuracy, and/or the like) associated with completing training materials, information received from the monitoring devices, and/or the like. The artificial intelligence task management system may train the machine learning model using historical data associated with determining the level of training of the user and/or a level of training of other users (e.g., using past analyses to determine the level of training of the user or the other users). Using the historical data and the one or more performance metrics to determine the level of training of the user and/or level of training of other users (e.g., using the one or more parameters as inputs to the machine learning model), the artificial intelligence task management system may determine the level of training of the user.

In some implementations, a machine learning model (e.g., the task management model) may be used to determine a level of expertise of the user based on one or more of the performance metrics, such as timing associated with training (e.g., a time of day, week, month, year, and/or the like), a schedule of the user, an amount of training that the user has done, the training materials that the user has accessed, the training materials that the user has completed, performance characteristics (e.g., speed, timeliness, accuracy, and/or the like) associated with completing training materials, user input from the user associated with the training materials, tasks that have been performed by the user, tasks that have been completed by the user, types of tasks that have been performed or completed by the user, performance characteristics (e.g., speed, timeliness, accuracy and/or the like) associated with performing the tasks, user input from the user associated with performing the tasks, information received from the monitoring devices, and/or the like. The artificial intelligence task management system may train the machine learning model using historical data associated with determining the level of expertise of the user and/or of other users (e.g., using past analyses to determine the level of expertise of the user or other users). Using the historical data and the one or more performance metrics to determine the level of expertise of the user or other users (e.g., using the one or more parameters as inputs to the machine learning model), the artificial intelligence task management system may select and/or obtain training materials that are to be completed and/or performed by the user.

As further shown in FIG. 1, and by reference number 150, the artificial intelligence task management system may update an artificial intelligence module, based on the level of training and/or the level of expertise of the user, using information from the user.

The artificial intelligence task management system may use a determined level of training to determine whether the user is to continue training (e.g., to help the user learn more about a particular subject) or whether the user is to perform tasks associated with the subject matter. For example, if the level of training indicates that the user has knowledge of the subject matter and/or is capable of performing one or more tasks, the artificial intelligence module may be reconfigured to select tasks that are to be performed by the user. Additionally, or alternatively, if the level of training indicates that the user has not sufficiently learned the subject matter, the artificial intelligence module may cause the artificial intelligence task management system to select more training material (e.g., the same set of training material or a different set of training material, depending on the user's performance while training using the previous set of training material).

The artificial intelligence task management system may use a determined level of expertise to determine whether the user is capable of adjusting a configuration of the artificial intelligence module of the artificial intelligence task management system. For example, when the artificial intelligence task management system determines that the user has a threshold level of expertise (e.g., based on the performance metrics and/or a scoring system that uses the performance metrics), the artificial intelligence task management system may permit the user to update the artificial intelligence module and/or use information from the user to update the artificial intelligence module. In such cases, the user may adjust task complexity for performing tasks, adjust training material course work and/or complexity, adjust performance metrics (e.g., speed thresholds, accuracy thresholds, timeliness thresholds, and/or the like) associated with performing the tasks and/or training, and/or the like. In some implementations, if the user performs a set of tasks, and the artificial intelligence task management system determines from performance metrics of the user preforming the tasks, that the user does not have the threshold level expertise, the artificial intelligence task management system may select a next set of tasks for the user to perform (e.g., based on the performance metrics associated with performing the tasks).

In some implementations, the artificial intelligence task management system may use one or more knowledge graphs to determine whether a user has a sufficient level of training to perform one or more tasks, that the user has as sufficient level of expertise to perform one or more tasks, and/or that the user has a sufficient level of expertise to transfer learning to the artificial intelligence task management system and allow the artificial intelligence task management system to adjust and/or reconfigure an artificial intelligence module of the artificial intelligence task management system. For example, the one or more knowledge graphs may be updated and/or edited to identify performance metrics corresponding to the user performing certain tasks, a difficulty level associated with performing the tasks, and/or the like. If the knowledge graph reflects a knowledge graph that corresponds to a threshold level of expertise (e.g., a threshold number of performance metrics and/or task difficulty levels of a knowledge graph for the user matches performance metrics and/or task difficulty levels for a threshold level of expertise), the artificial intelligence task management system may determine the user has a threshold level of expertise. Similarly, knowledge graphs may be used to determine when a user has reached a threshold level of training and/or is capable of performing tasks.

Accordingly, as described herein, an artificial intelligence task management system may train a user, select tasks for the user to perform, monitor performance of the tasks of the user, and enable the user to adjust an artificial intelligence module of the artificial intelligence task management system based on a level of expertise of the user. The artificial intelligence module may include one or more machine learning modules that can be used to select training materials, select tasks, determine the level of training, and/or determine the level of expertise of the user. As such, the artificial intelligence task management system may automatically enable a reconfiguration of the artificial intelligence module when the artificial intelligence task management system determines that the user has a threshold level of expertise. Accordingly, the artificial intelligence module can be updated to address any issues identified by the user, thus improving the capabilities of the artificial intelligence module to accurately and/or quickly adapt to one or more users, operations, and/or organizations associated with the artificial intelligence task management system.

As indicated above, FIG. 1 is provided merely as an example. Other examples are possible and may differ from what was described with regard to FIG. 1.

Figure 2:
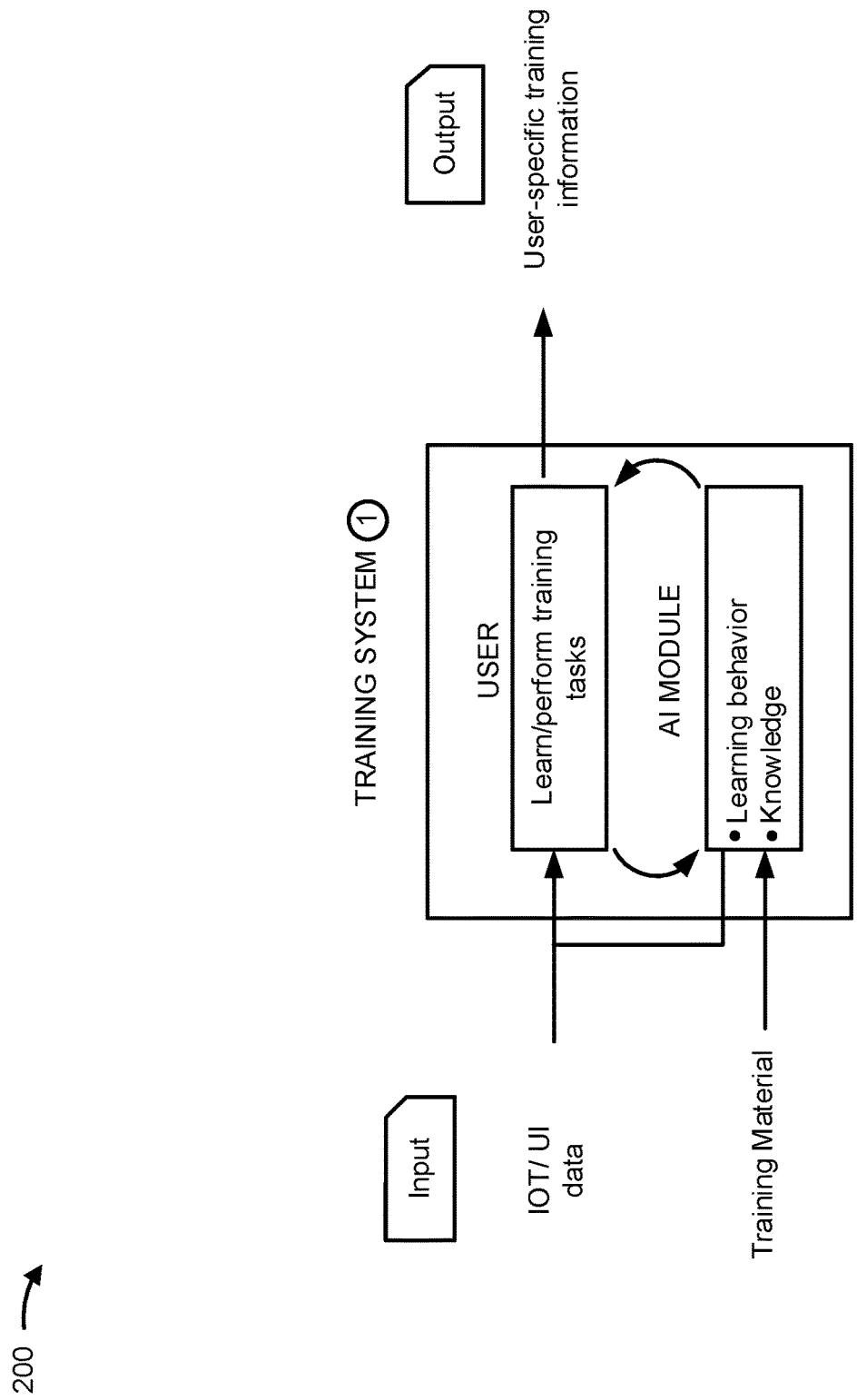
FIG. 2 is a diagram of an example implementation of a training system that may be used in the example implementation of FIG. 1.

FIG. 2 a diagram of an example implementation 200 of a training system that may be used in the example implementation of FIG. 1. As shown in the example of a FIG. 2, the training system receives data from the monitoring devices (IOT data) and data from the user interface (UI data) and the training material as an input. The training system may provide user-specific training information to another system of the artificial intelligence task management system (e.g., the task management system or the artificial intelligence management system), as described herein.

As shown in the example implementation 200 of FIG. 2, as a user learns/performs training tasks, the artificial intelligence module may detect a learning behavior and/or knowledge of the user. The learning behavior may indicate which types of training tasks and/or training materials that enabled the user to excel and/or which types of training tasks and/or training materials caused the user to struggle. For example, the user may have performed well when application-based tasks were provided, but did not perform well when theoretical based tasks were provided. Once the artificial intelligence module determines that the user has a sufficient level of training (e.g., based on the detected knowledge), the user may provide the user specific training information to the task management system to permit the user to begin performing tasks. The user-specific training information may include the level of training (which may reflect the user's knowledge of the training material) and/or one or more learning behaviors of the user.

In some implementations, as described herein, the training system may be implemented by a machine learning model, referred to as a training model. Accordingly, the data from the monitoring devices, the data from the user interface, and the training material may be used as inputs to the training model. Historical data associated with training the user may also be stored and/or kept as an input to the training model. Accordingly, using the historical data, the data from the monitoring devices, the data form the user interface, and the training material, the training model may determine the learning behavior and/or the knowledge of the user and correspondingly output such information to another system (e.g., the task management system or the artificial intelligence management system) of the artificial intelligence task management system.

Accordingly, the training system of example implementation 200 may be used to determine a learning behavior and/or user's knowledge of training material to determine whether the user may be capable of performing one or tasks associated with the training or tasks associated with operations.

As indicated above, FIG. 2 is provided merely as an example. Other examples are possible and may differ from what was described with regard to FIG. 2.

Figure 3:
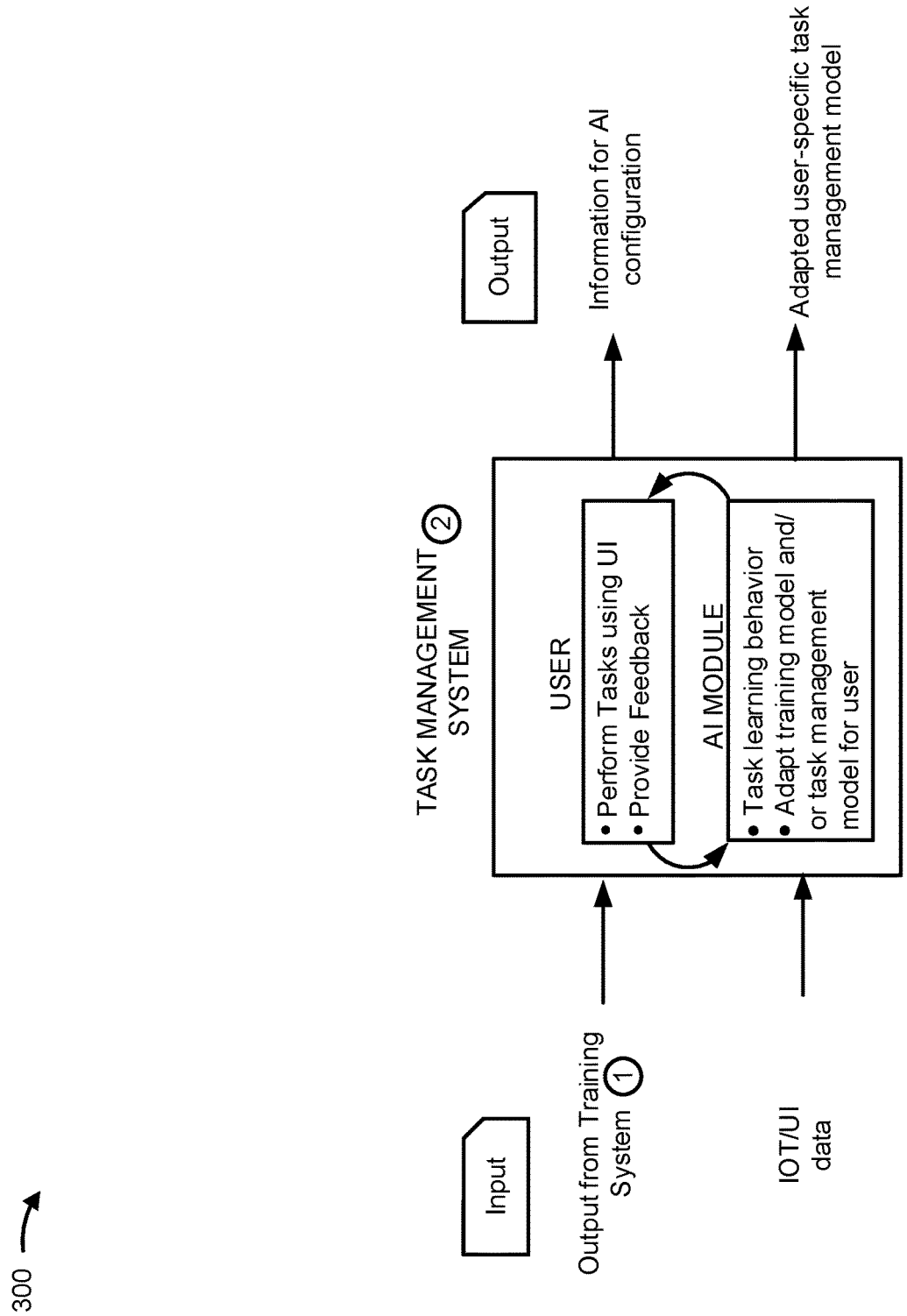
FIG. 3 is a diagram of an example implementation of a task management system that may be used in the example implementation of FIG. 1.

FIG. 3 is a diagram of an example implementation 300 of a task management system that may be used in the example implementation of FIG. 1. As shown in the example of FIG. 3, the task management system receives the output from training system (e.g., user-specific learning behavior, knowledge, and/or the like), data from the monitoring devices (IOT data), and/or data from the user interface (UI data) as an input. The task management system may provide information for artificial intelligence configuration and/or information for a user specific task management model (e.g., learning behavior, user strengths, and/or the like), as described herein.

As shown in the example implementation 300 of FIG. 3, as a user performs tasks and/or provides feedback, the artificial intelligence module continues determining a learning behavior of the user (e.g., based on performing the tasks) and adapt a training model and/or a task management model for the user. The learning behavior may correspond to how the user performs one or more tasks, which tasks the user excels at performing, which tasks the user struggles to perform, and/or the like. For example, the user may excel when performing a first type of tasks, but may struggle for other types of tasks. Accordingly, the task management model may select training tasks associated with the second type of tasks and/or may select tasks that cater to the user's strengths (as determined from the performance metrics while performing the training tasks).

In some implementations, as described herein, the task management system may be implemented by a machine learning model, referred to herein as a task management model. Accordingly, output from the training system, data form the monitoring devices, and data from the user interface may be used as input to the task management model. Historical data associated with the user performing tasks may also be stored and/or kept as an input to the task training model. Accordingly, using the historical data, the output from the training system, the data from the monitoring devices, and the data from the user interface, the task management model may determine learning behavior of the user associated with performing tasks and adapt the task management model accordingly for the user. Furthermore, the task management model may determine whether information to update and/or configure the artificial intelligence module is to be provided to the artificial intelligence management system. For example, the task management system, using the task management model, may determine whether the user has a threshold level of expertise to update and/or reconfigure the artificial intelligence module of the artificial intelligence task management system.

As indicated above, FIG. 3 is provided merely as an example. Other examples are possible and may differ from what was described with regard to FIG. 3.

Figure 4:
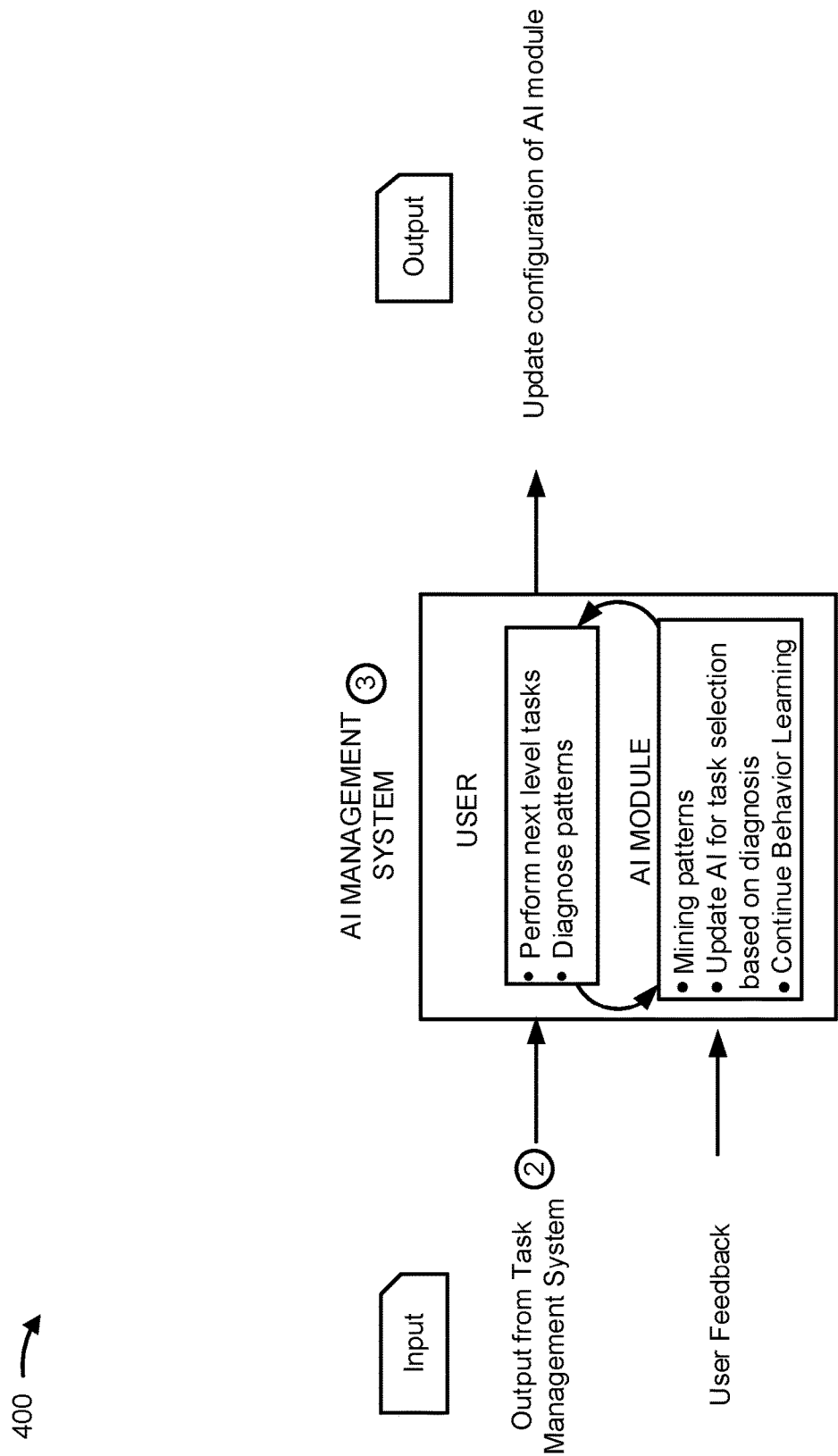
FIG. 4 is a diagram of an example implementation of an artificial intelligence management system that may be used in the example implementation of FIG. 1.

FIG. 4 is a diagram of an example implementation of an artificial intelligence management system that may be used in the example implementation of FIG. 1. As shown in the example of FIG. 4, the artificial intelligence management system receives the output from the task management system (e.g., information for artificial intelligence configuration, and/or the adapted user-specific task management model) and user feedback as input. The artificial intelligence management system processes the inputs, as described herein, and updates a configuration of the artificial intelligence module based on the feedback and/or information received from the task management system (e.g., a level of expertise of the user).

As shown in the example implementation 400 of FIG. 4, as a user performs next level tasks (e.g., corresponding to tasks for users that have a threshold level of expertise), the user may diagnose patterns detected within the tasks and/or patterns associated with operations of the tasks. The user may provide feedback associated with the patterns that indicate that the artificial intelligence module is to be reconfigured and/or adjusted (e.g., to provide different tasks, to reorder a sequence of tasks and/or training materials, to determine a level of expertise according to different performance metrics or different weights of the performance metrics, and/or the like). Furthermore, the artificial intelligence module may mine the patterns, update a configuration of the artificial intelligence module based on the patterns and/or user feedback, and further continue learning behavior of the user.

In some implementations, as described herein, the artificial intelligence management system may include and/or by implemented by the artificial intelligence module. Accordingly, output from the training system, the task management system, and/or user feedback may be used as inputs to the artificial intelligence module. Historical data associated with the user diagnosing patterns and/or providing feedback may be stored and/or kept as an input to the artificial intelligence module. Accordingly, using the historical data, the output from the training system and/or the task management system, and the user feedback, the artificial intelligence module may enable an artificial intelligence configuration to be updated and/or automatically update the artificial intelligence configuration according to the user feedback and a determination that the user has a threshold level of expertise (e.g., according to the task management model).

As indicated above, FIG. 4 is provided merely as an example. Other examples are possible and may differ from what was described with regard to FIG. 4.

Figure 5:
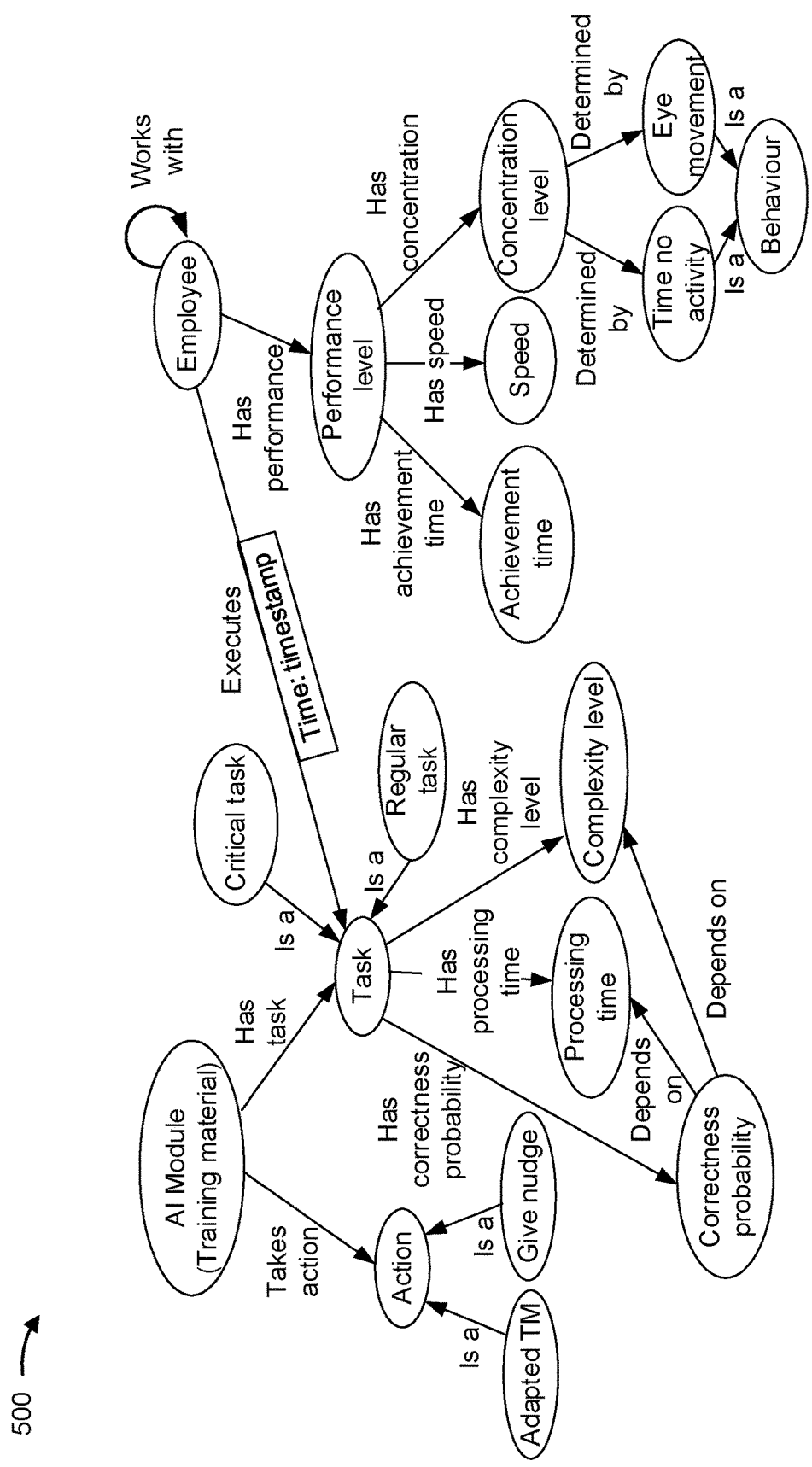
FIG. 5 is a diagram of an example knowledge graph that may be used in accordance with an example implementation described herein.

FIG. 5 is a diagram of an example knowledge graph 500 that may be used in accordance with an example implementation described herein. In the example of FIG. 5, the knowledge graph 500 may be used to identify expert performance of an individual, shown as an employee. Such identification may be an inflection point at which the employee may transition from learning via the artificial intelligence task management system to providing training and/or feedback to the artificial intelligence task management system.

As shown in FIG. 5, an artificial intelligence module (which may include training materials) provides a list of activities and/or tasks. Each of the tasks may belong to one of two categories, shown as a critical task or a regular task. As shown the task or activity may have a set of characteristics, such as an estimated processing time, a complexity level and/or a correctness probability of the task achievement (which may indicate a level of accuracy of performing the tasks). Because a task can be correctly done in many various ways, there can be many ways of having correct solutions to a task and/or a correctness probability of how well a task has been done. Therefore, the artificial intelligence module may determine whether or not the achieved activity and/or task has been completed with a threshold level of correctness.

As further shown in FIG. 5, in knowledge graph 500, an employee entity has a performance level defined by an achievement time of a task, a speed, and a concentration level when executing an activity and/or task. The artificial intelligence module may take actions according to the employee learned behavior. For example, the artificial intelligence module may give a nudge for an employee with a relatively low concentration level (e.g., as defined by input form monitoring devices) or notification to that employee taking too taking too much time on a task, and/or the like. Furthermore, the artificial intelligence module can adapt the training material regarding the performance level of the employee on one or more tasks (e.g., by subsequently providing easier or more complex training materials).

In some implementations, to estimate and/or determine the level of expertise level threshold, an artificial intelligence module may—i) iteratively estimate the employee performance based on a sequential list of tasks given to employees, the list of tasks being dynamically updated in each iteration, (and characteristics of the tasks), and properties associated with performing the tasks (e.g., correctness, processing time, complexity, and/or the like) by getting the better estimated instance of the task properties from better performances of other employees, and ii) challenging high performing employees until a multi criteria optimization problem is satisfied while evaluating the employee performance against other employees performances (e.g., historical performances included in historical data associated with the artificial intelligence module).

As indicated above, FIG. 5 is provided merely as an example. Other examples are possible and may differ from what was described with regard to FIG. 5.

Figure 6:
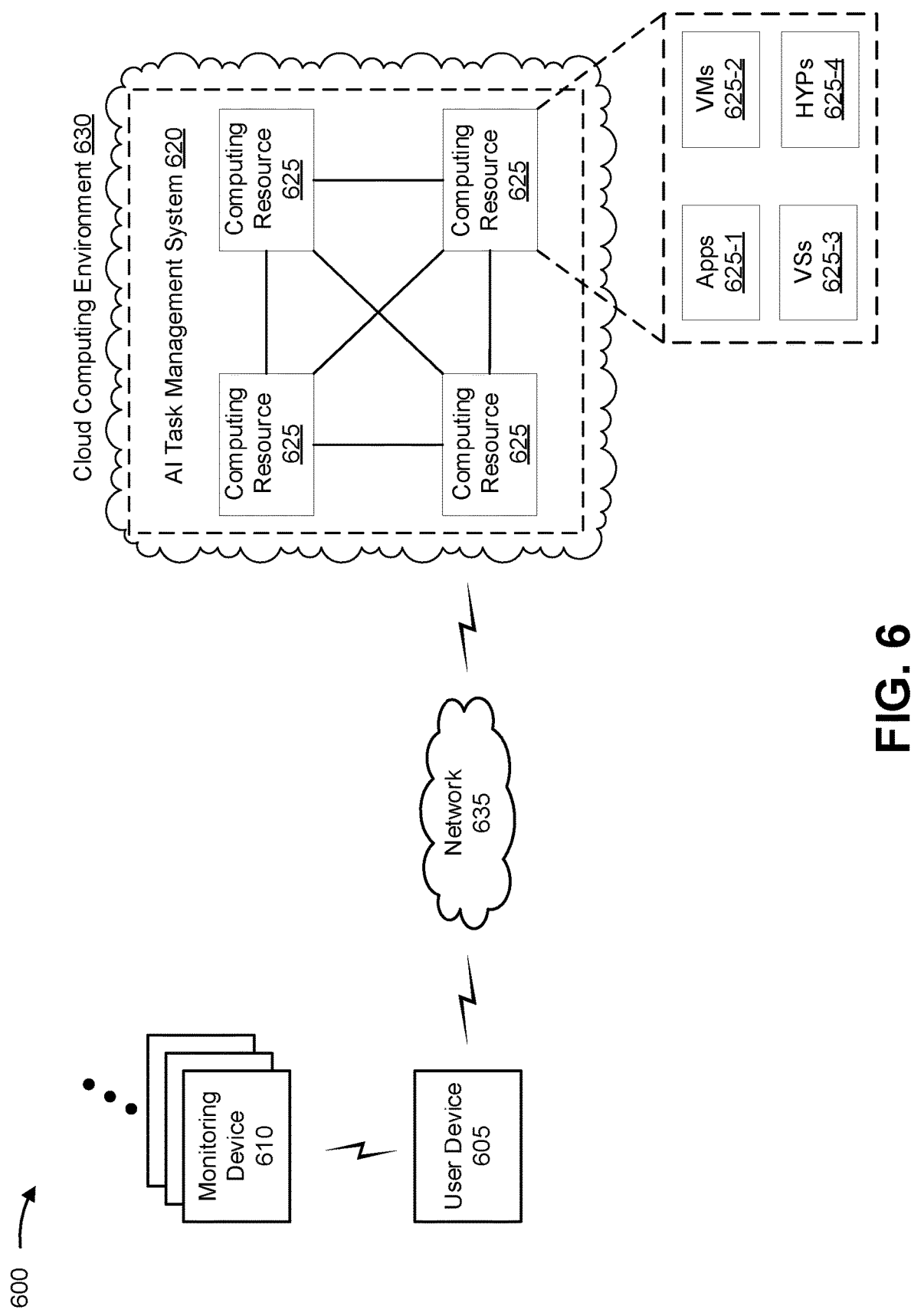
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a user device 605, a monitoring device 610, an artificial intelligence task management system 620, a computing resource 625, a cloud computing environment 630, and a network 635. Devices of environment 600 may interconnect via wired connections, wireless connections, or a combination of wired and wireless connections.

User device 605 includes one or more devices capable of receiving, generating, storing, processing, and/or providing information associated with training and/or performing one or more tasks, as described herein. For example, user device 605 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 605 provides a user interface that may be used by a user to provide feedback and/or reconfigure an artificial intelligence module, as described herein.

Monitoring device 610 includes one or more devices capable of obtaining, generating, storing, and/or providing information associated with monitoring a user. For example, monitoring device 610 may include one or more components of user device 605, a wearable device (e.g., a smart watch, a health monitor watch, and/or the like), a camera, a microphone, a sensor device, an IoT device, a heart monitor, and/or the like.

Artificial intelligence task management system 620 includes one or more devices (e.g., computing resources) capable of managing an artificial intelligence module, a training model, and/or task management model, as described herein. Artificial intelligence task management system 620 may correspond to the artificial intelligence task management system described in connection with FIGS. 1-4, 5A, and 5B. For example, artificial intelligence task management system 620 may be a platform implemented by cloud computing environment 630 that may monitor performance metrics associated with a user training and/or performing tasks and update the artificial intelligence module when the user has a threshold level of expertise. In some implementations, artificial intelligence task management system 620 is implemented by computing resources 625 of cloud computing environment 630.

In some implementations, artificial intelligence task management system 620 may include a server device or a group of server devices. In some implementations, artificial intelligence task management system 620 may be hosted in cloud computing environment 630. Notably, while implementations described herein describe artificial intelligence task management system 620 as being hosted in cloud computing environment 630, in some implementations, artificial intelligence task management system 620 may not be cloud-based or may be partially cloud-based.

Cloud computing environment 630 includes an environment that delivers computing as a service, whereby shared resources, services, etc. may be provided to user device 605. Cloud computing environment 630 may provide computation, software, data access, storage, and/or other services that do not require end-user knowledge of a physical location and configuration of a system and/or a device that delivers the services. As shown, cloud computing environment 630 may include artificial intelligence task management system 620 and computing resource 625.

Computing resource 625 includes one or more personal computers, workstation computers, server devices, or another type of computation and/or communication device. In some implementations, computing resource 625 may host artificial intelligence task management system 620. The cloud resources may include compute instances executing in computing resource 625, storage devices provided in computing resource 625, data transfer devices provided by computing resource 625, etc. In some implementations, computing resource 625 may communicate with other computing resources 625 via wired connections, wireless connections, or a combination of wired and wireless connections.

As further shown in FIG. 6, computing resource 625 may include a group of cloud resources, such as one or more applications ("APPs") 625-1, one or more virtual machines ("VMs") 625-2, virtualized storage ("VSs") 625-3, one or more hypervisors ("HYPs") 625-4, or the like.

Application 625-1 includes one or more software applications that may be provided to or accessed by user device 605. Application 625-1 may eliminate a need to install and execute the software applications on user device 605. For example, application 625-1 may include software associated with artificial intelligence task management system 620 and/or any other software capable of being provided via cloud computing environment 630. In some implementations, one application 625-1 may send/receive information to/from one or more other applications 625-1, via virtual machine 625-2.

Virtual machine 625-2 includes a software implementation of a machine (e.g., a computer) that executes programs like a physical machine. Virtual machine 625-2 may be either a system virtual machine or a process virtual machine, depending upon use and degree of correspondence to any real machine by virtual machine 625-2. A system virtual machine may provide a complete system platform that supports execution of a complete operating system ("OS"). A process virtual machine may execute a single program, and may support a single process. In some implementations, virtual machine 625-2 may execute on behalf of a user (e.g., user device 605), and may manage infrastructure of cloud computing environment 630, such as data management, synchronization, or long-duration data transfers.

Virtualized storage 625-3 includes one or more storage systems and/or one or more devices that use virtualization techniques within the storage systems or devices of computing resource 625. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 625-4 provides hardware virtualization techniques that allow multiple operating systems (e.g., "guest operating systems") to execute concurrently on a host computer, such as computing resource 625. Hypervisor 625-4 may present a virtual operating platform to the guest operating systems, and may manage the execution of the guest operating systems. Multiple instances of a variety of operating systems may share virtualized hardware resources.

Network 635 includes one or more wired and/or wireless networks. For example, network 635 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
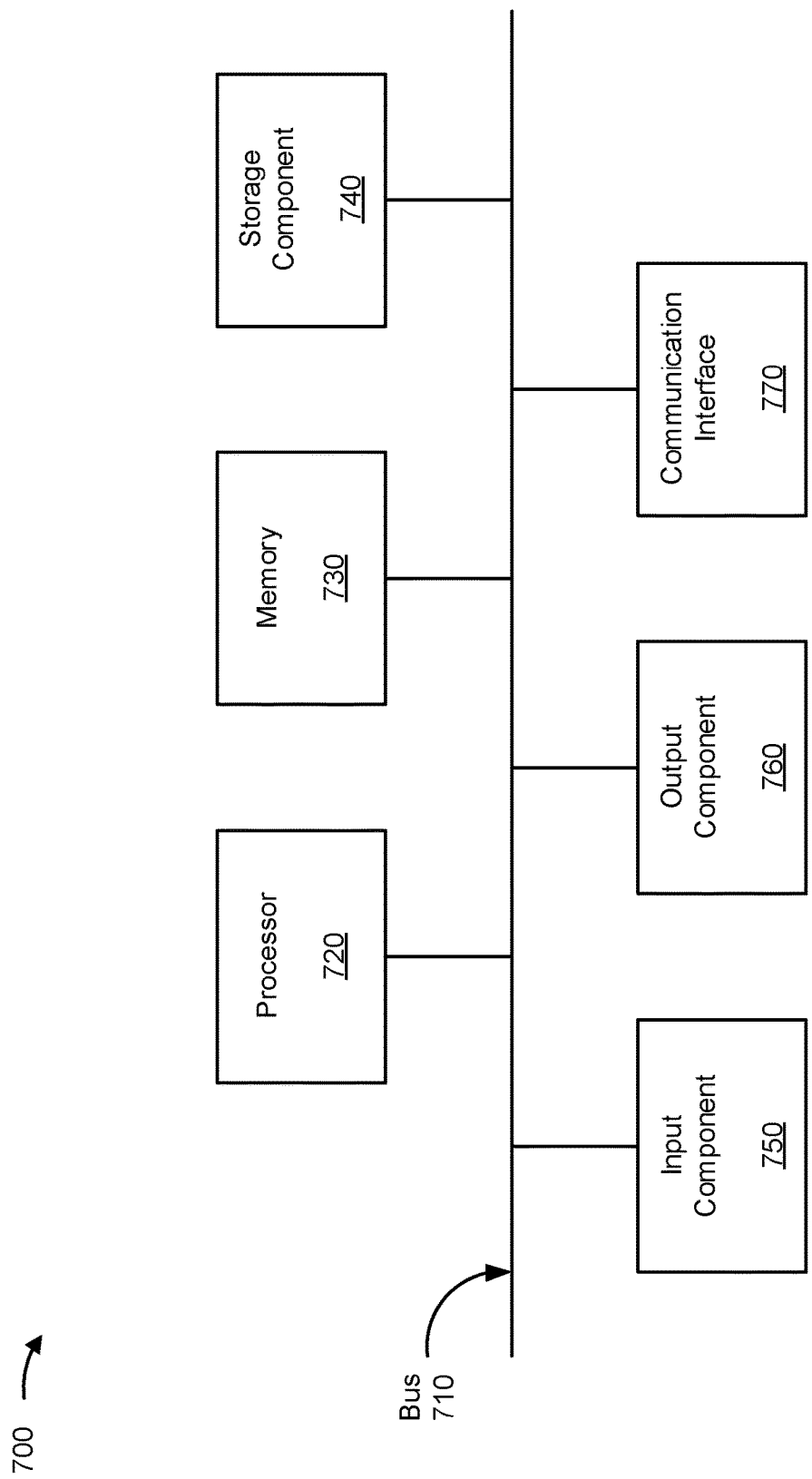
FIG. 7 is a diagram of example components of one or more devices of FIG. 6.

FIG. 7 is a diagram of example components of a device 700. Device 700 may correspond to user device 605, monitoring device 610, artificial intelligence task management system 620, and/or computing resource 625. In some implementations, user device 605, monitoring device 610, artificial intelligence task management system 620, and/or computing resource 625 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes based on to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
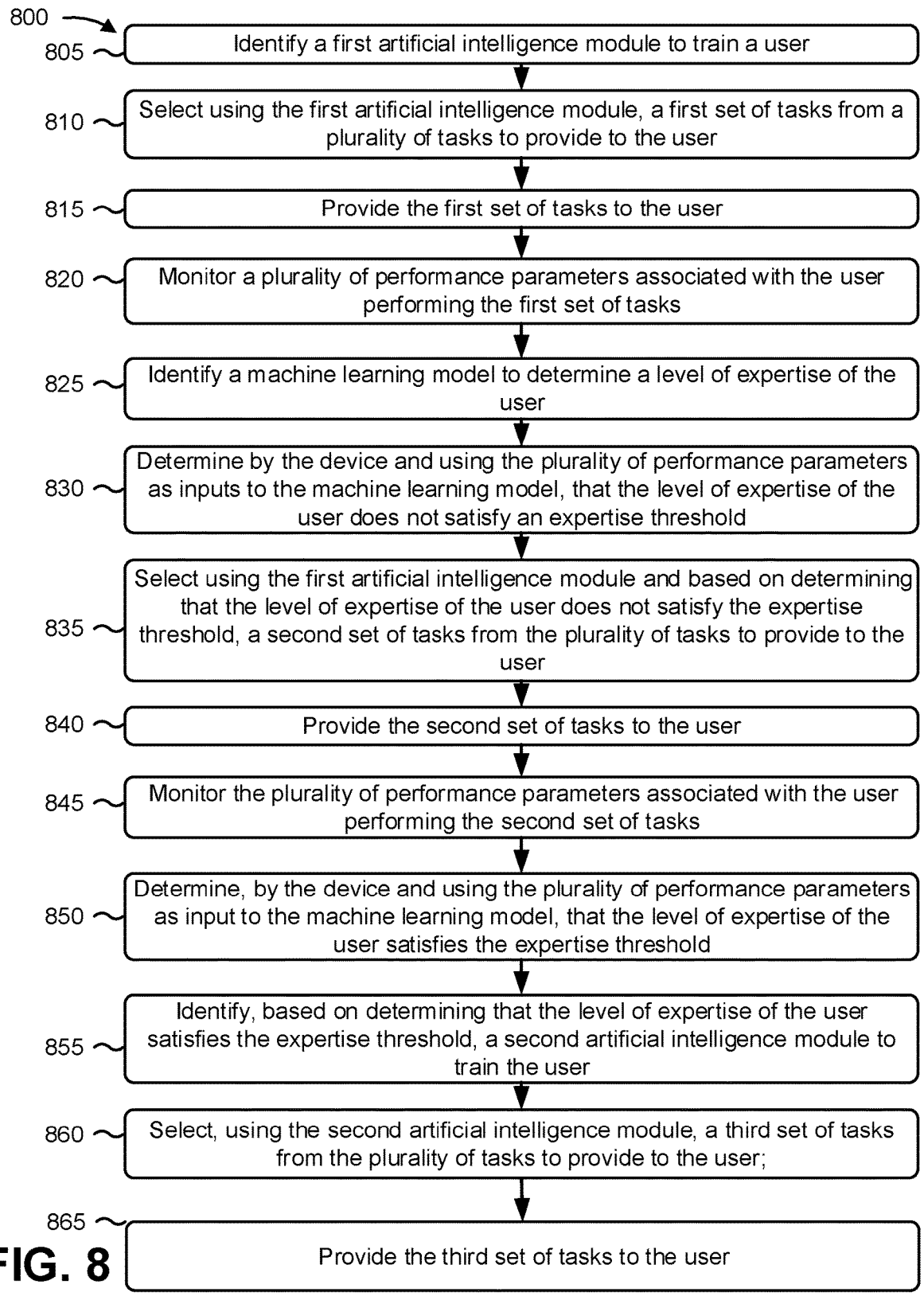
FIGS. 8-10 are flow charts of example processes associated with adaptive artificial intelligence for user training and task management.

FIG. 8 is a flow chart of an example process 800 associated with adaptive artificial intelligence for user training and task management. In some implementations, one or more process blocks of FIG. 8 may be performed by an artificial intelligence task management system (e.g., artificial intelligence task management system 620). In some implementations, one or more process blocks of FIG. 8 may be performed by another device or a group of devices separate from or including Artificial intelligence task management system (e.g., artificial intelligence task management system 620), such a user device (e.g., user device 605), a monitoring device (e.g., monitoring device 610), and a computing resource (e.g., computing resource 625).

As shown in FIG. 8, process 800 may include identifying a first artificial intelligence module to train a user (block 805). For example, the artificial intelligence task management system (e.g., using computing resource 625, processor 720, and/or the like) may identify an artificial intelligence module to train a user, as described above.

As further shown in FIG. 8, process 800 may include selecting, using the first artificial intelligence module, a first set of tasks from a plurality of tasks to provide to the user (block 810). For example, the artificial intelligence task management system (e.g., using computing resource 625, processor 720, and/or the like) may select, using the artificial intelligence module, a first set of tasks from a plurality of tasks to provide to the user, as described above.

As further shown in FIG. 8, process 800 may include providing the first set of tasks to the user (block 815). For example, the artificial intelligence task management system (e.g., using computing resource 625, processor 720, output component 760, communication interface 770, and/or the like) may provide the first set of tasks to the user, as described above.

As further shown in FIG. 8, process 800 may include monitoring a plurality of performance parameters associated with the user performing the first set of tasks (block 820). For example, the artificial intelligence task management system (e.g., using computing resource 625, processor 720, input component 750, communication interface 770, and/or the like) may monitor a plurality of performance parameters associated with the user performing the first set of tasks, as described above.

As further shown in FIG. 8, process 800 may include identifying a machine learning model to determine a level of expertise of the user (block 825). For example, the artificial intelligence task management system (e.g., using computing resource 625, processor 720, and/or the like) may identify a machine learning model to determine a level of expertise of the user, as described above.

As further shown in FIG. 8, process 800 may include determining, using the plurality of performance parameters as inputs to the machine learning model, that the level of expertise of the user does not satisfy an expertise threshold (block 830). For example, the artificial intelligence task management system (e.g., using computing resource 625, processor 720, and/or the like) may determine, using the plurality of performance parameters as inputs to the machine learning model, that the level of expertise of the user does not satisfy an expertise threshold, as described above.

As further shown in FIG. 8, process 800 may include selecting, using the first artificial intelligence module and based on determining that the level of expertise of the user does not satisfy the expertise threshold, a second set of tasks from the plurality of tasks to provide to the user (block 835). For example, the artificial intelligence task management system (e.g., using computing resource 625, processor 720, and/or the like) may select, using the artificial intelligence module and based on determining that the level of expertise of the user does not satisfy the expertise threshold, a second set of tasks from the plurality of tasks to provide to the user, as described above.

As further shown in FIG. 8, process 800 may include providing the second set of tasks to the user (block 840). For example, the artificial intelligence task management system (e.g., using computing resource 625, processor 720, output component 760, communication interface 770, and/or the like) may provide the second set of tasks to the user, as described above.

As further shown in FIG. 8, process 800 may include monitoring the plurality of performance parameters associated with the user performing the second set of tasks (block 845). For example, the artificial intelligence task management system (e.g., using computing resource 625, processor 720, input component 750, communication interface 770, and/or the like) may monitor the plurality of performance parameters associated with the user performing the second set of tasks, as described above.

As further shown in FIG. 8, process 800 may include determining, using the plurality of performance parameters as input to the machine learning model, that the level of expertise of the user satisfies the expertise threshold (block 850). For example, the artificial intelligence task management system (e.g., using computing resource 625, processor 720, and/or the like) may determine, using the plurality of performance parameters as input to the machine learning model, that the level of expertise of the user satisfies the expertise threshold, as described above.

As further shown in FIG. 8, process 800 may include identifying, based on determining that the level of expertise of the user satisfies the expertise threshold, a second artificial intelligence module to train the user (block 855). For example, the artificial intelligence task management system (e.g., using computing resource 625, processor 720, and/or the like) may identify, based on determining that the level of expertise of the user satisfies the expertise threshold, a second artificial intelligence module to train the user, as described above.

As further shown in FIG. 8, process 800 may include selecting, using the second artificial intelligence module, a third set of tasks from the plurality of tasks to provide to the user (block 860). For example, the artificial intelligence task management system (e.g., using computing resource 625, processor 720, and/or the like) may select, using the second artificial intelligence module, a third set of tasks from the plurality of tasks to provide to the user.

As further shown in FIG. 8, process 800 may include providing the third set of tasks to the user. For example, the artificial intelligence task management system (e.g., using computing resource 625, processor 720, output component 760, communication interface 770, and/or the like).

Process 800 may include additional implementations, such as any single implementation or any combination of implementations described below and/or in connection with one or more other processes described elsewhere herein.

In some implementations, the artificial intelligence task management system may obtain a configuration update to the first artificial intelligence module from the user and update the first artificial intelligence module to use the configuration update in association with training one or more users. In some implementations, the first artificial intelligence module is updated based on the level of expertise of the user satisfying the expertise threshold.

In some implementations, the artificial intelligence task management system may monitor the plurality of performance parameters when the user performs the third set of tasks; determine, using the plurality of performance parameters when the user performs the third set of tasks as inputs to the machine learning model, that the level of expertise of the user satisfies the expertise threshold; based on determining that the level of expertise of the user satisfies the expertise threshold, identify a third artificial intelligence module to train the user; select, using the third artificial intelligence module, a fourth set of tasks from the plurality of tasks to provide to the user; and provide the fourth set of tasks to the user.

In some implementations, the machine learning model includes a knowledge graph model. In some implementations, the artificial intelligence task management system may, when providing the third set of tasks to the user, display visual information associated with the third set of tasks on a display of a user interface.

In some implementations, the artificial intelligence module includes the machine learning model. In some implementations, the artificial intelligence module is configured to select the first set of tasks and the second set of tasks from the plurality of tasks based on the level of expertise of the user determined using the machine learning model. In some implementations, the artificial intelligence task management system may update the artificial intelligence module to use the configuration update in association with selecting tasks from the plurality of tasks.

In some implementations, the plurality of performance parameters associated with performing the first set of tasks or the second set of tasks includes a biometric of the user and at least one of: timeliness to complete one of the first set of tasks or the second set of tasks; speed while performing the first set of tasks or the second set of tasks; a level of accuracy associated with performing the first set of tasks or the second set of tasks; efficiency associated with performing the first set of tasks or the second set of tasks; or a level of difficulty associated with the first set of tasks or the second set of tasks. In some implementations, at least one of the plurality of performance parameters is determined using information from one or more sensors monitoring the user while the user is performing the first set of tasks and/or the second set of tasks.

In some implementations, the machine learning model is a first machine learning model, and the artificial intelligence task management system may select, using the artificial intelligence module, training material to provide to the user to train the user; provides the training material to the user; monitor a plurality of training parameters associated with the user training with the training material; identify a second machine learning model to determine whether the user has a level of training; determine, using the plurality of training parameters as inputs to the second machine learning model, whether the level of training of the user satisfies a training threshold; and select the first set of tasks from the plurality of tasks based on determining that the level of training of the user satisfies the training threshold. In some implementations, the first set of tasks and second set of tasks are associated with a same topic as the training material.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
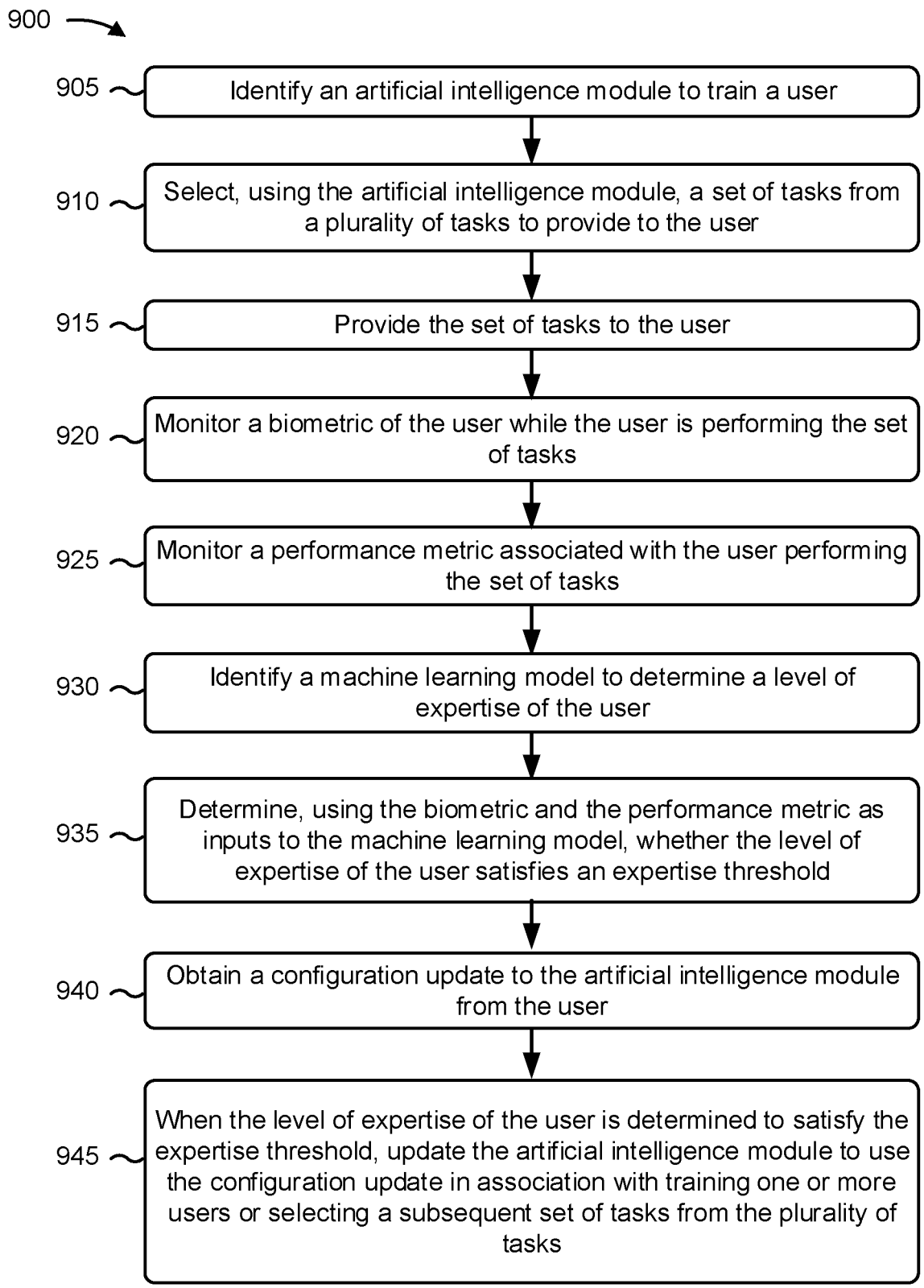

FIG. 9 is a flow chart of an example process 900 associated with adaptive artificial intelligence for user training and task management. In some implementations, one or more process blocks of FIG. 9 may be performed by an artificial intelligence task management system (e.g., artificial intelligence task management system 620). In some implementations, one or more process blocks of FIG. 9 may be performed by another device or a group of devices separate from or including artificial intelligence task management system (e.g., artificial intelligence task management system 620), such a user device (e.g., user device 605), a monitoring device (e.g., monitoring device 610), and a computing resource (e.g., computing resource 625).

As shown in FIG. 9, process 900 may include identifying an artificial intelligence module to train a user (block 905). For example, the artificial intelligence task management system (e.g., using computing resource 625, processor 720, and/or the like) may identify an artificial intelligence module to train a user, as described above.

As further shown in FIG. 9, process 900 may include selecting, using the artificial intelligence module, a set of tasks from a plurality of tasks to provide to the user (block 910). For example, the artificial intelligence task management system (e.g., using computing resource 625, processor 720, and/or the like) may select, using the artificial intelligence module, a set of tasks from a plurality of tasks to provide to the user, as described above.

As further shown in FIG. 9, process 900 may include providing the set of tasks to the user (block 915). For example, the artificial intelligence task management system (e.g., using computing resource 625, processor 720, output component 760, communication interface 770, and/or the like) may provide the set of tasks to the user, as described above.

As further shown in FIG. 9, process 900 may include monitoring a biometric of the user while the user is performing the set of tasks (block 920). For example, the artificial intelligence task management system (e.g., using computing resource 625, processor 720, input component 750, communication interface 770, and/or the like) may monitor a biometric of the user while the user is performing the set of tasks, as described above.

As further shown in FIG. 9, process 900 may include monitoring a performance metric associated with the user performing the set of tasks (block 925). For example, the artificial intelligence task management system (e.g., using computing resource 625, processor 720, input component 750, communication interface 770, and/or the like) may monitor a performance metric associated with the user performing the set of tasks, as described above.

As further shown in FIG. 9, process 900 may include identifying a machine learning model to determine a level of expertise of the user (block 930). For example, the artificial intelligence task management system (e.g., using computing resource 625, processor 720, and/or the like) may identify a machine learning model to determine a level of expertise of the user, as described above.

As further shown in FIG. 9, process 900 may include determining, using the biometric and the performance metric as inputs to the machine learning model, whether the level of expertise of the user satisfies an expertise threshold (block 935). For example, the artificial intelligence task management system (e.g., using computing resource 625, processor 720, and/or the like) may determine, using the biometric and the performance metric as inputs to the machine learning model, whether the level of expertise of the user satisfies an expertise threshold, as described above.

As further shown in FIG. 9, process 900 may include obtaining a configuration update to the artificial intelligence module from the user (block 940). For example, the artificial intelligence task management system (e.g., using computing resource 625, processor 720, input component 750, communication interface 770, and/or the like) may obtain a configuration update to the artificial intelligence module from the user, as described above.

As further shown in FIG. 9, process 900 may include updating the artificial intelligence module to use the configuration update in association with training one or more users or selecting a subsequent set of tasks from the plurality of tasks (block 945). For example, the artificial intelligence task management system (e.g., using computing resource 625, processor 720, output component 760, communication interface 770, and/or the like) may update the artificial intelligence module to use the configuration update in association with training one or more users or selecting a subsequent set of tasks from the plurality of tasks, as described above.

Process 900 may include additional implementations, such as any single implementation or any combination of implementations described below and/or in connection with one or more other processes described elsewhere herein.

In some implementations, the biometric of the user comprises at least one of: an alertness level of the user; a stress level of the user; or a concentration level of the user. In some implementations, the performance metric includes at least one of: a timeliness associated with performing the tasks; a speed at which the user performs the set of tasks; a level of accuracy at which the user performs the set of tasks; an efficiency at which the user performs the tasks; or a level of difficulty associated with performing the set of tasks.

In some implementations, the artificial intelligence task management system may determine that the level of expertise of the user satisfies the expertise threshold based on the performance metric indicating to the machine learning model that the user performed the set of tasks at a threshold speed, at a threshold level of accuracy, or with a threshold efficiency and that the set of tasks were associated with a threshold level of difficulty.

In some implementations, when the level of expertise of the user does not satisfy the expertise threshold, the artificial intelligence module is not updated to use the configuration update in association with training the one or more users or selecting the subsequent set of tasks from the plurality of tasks. In some implementations, the artificial intelligence module is configured specifically for the user. In some implementations, the set of tasks comprises an activity or operation associated with a term of employment or education.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
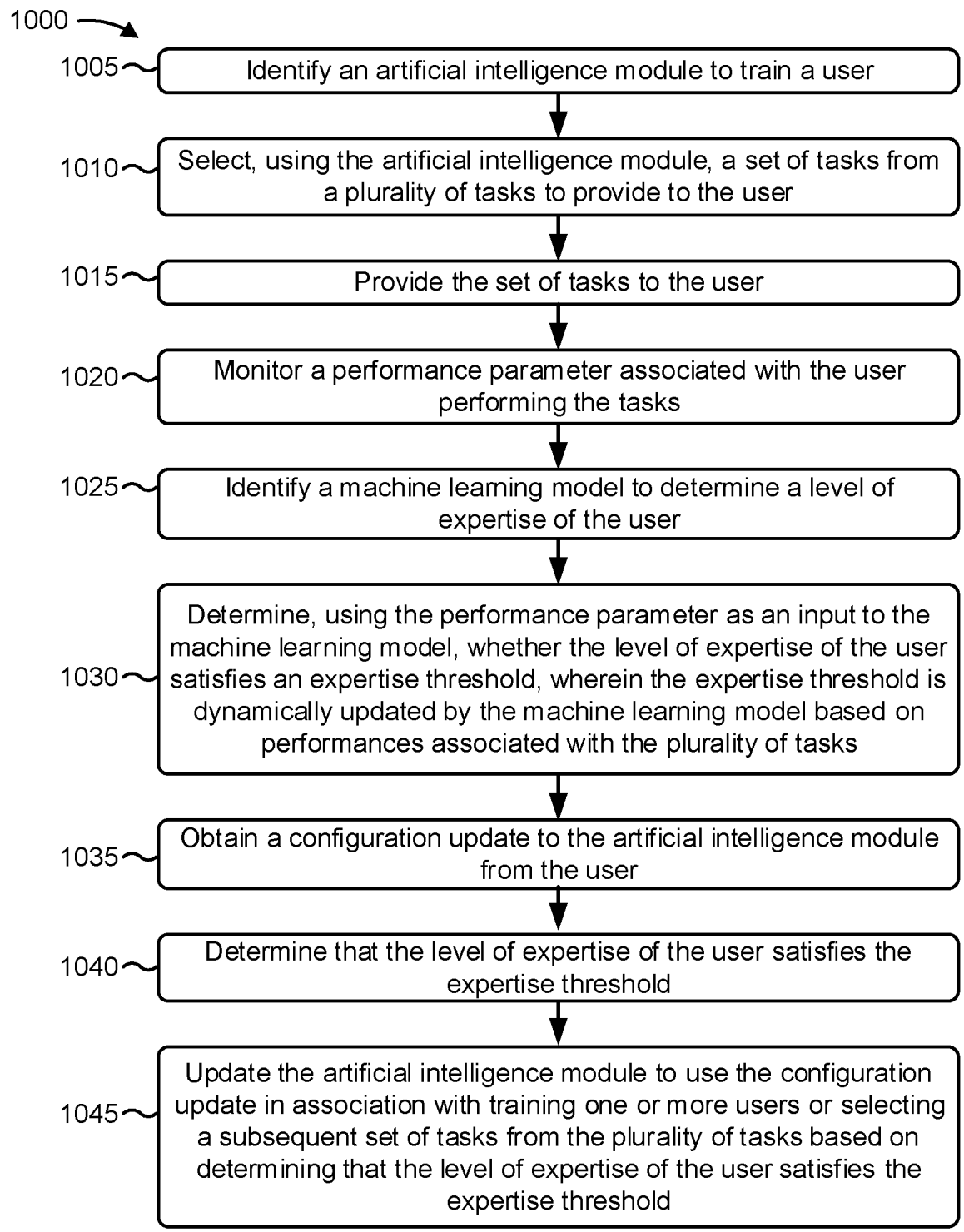

FIG. 10 is a flow chart of an example process 1000 for associated with adaptive artificial intelligence for user training and task management. In some implementations, one or more process blocks of FIG. 10 may be performed by an artificial intelligence task management system (e.g., artificial intelligence task management system 620). In some implementations, one or more process blocks of FIG. 10 may be performed by another device or a group of devices separate from or including artificial intelligence task management system (e.g., artificial intelligence task management system 620), such a user device (e.g., user device 605), a monitoring device (e.g., monitoring device 610), and a computing resource (e.g., computing resource 625).

As shown in FIG. 10, process 1000 may include identifying an artificial intelligence module to train a user (block 1005). For example, the artificial intelligence task management system (e.g., using computing resource 625, processor 720, and/or the like) may identify an artificial intelligence module to train a user, as described above.

As further shown in FIG. 10, process 1000 may include selecting, using the artificial intelligence module, a set of tasks from a plurality of tasks to provide to the user (block 1010). For example, the artificial intelligence task management system (e.g., using computing resource 625, processor 720, and/or the like) may include select, using the artificial intelligence module, a set of tasks from a plurality of tasks to provide to the user, as described above.

As further shown in FIG. 10, process 1000 may include providing the set of tasks to the user (block 1015). For example, the artificial intelligence task management system (e.g., using computing resource 625, processor 720, output component 760, communication interface 770, and/or the like) may provide the set of tasks to the user, as described above.

As further shown in FIG. 10, process 1000 may include monitoring a performance parameter associated with the user performing the tasks (block 1020). For example, the artificial intelligence task management system (e.g., using computing resource 625, processor 720, input component 750, communication interface 770, and/or the like) may monitor a performance parameter associated with the user performing the tasks, as described above.

As further shown in FIG. 10, process 1000 may include identifying a machine learning model to determine a level of expertise of the user (block 1025). For example, the artificial intelligence task management system (e.g., using computing resource 625, processor 720, and/or the like) may identify a machine learning model to determine a level of expertise of the user, as described above.

As further shown in FIG. 10, process 1000 may include determining, using the performance parameter as an input to the machine learning model, whether the level of expertise of the user satisfies an expertise threshold, wherein the expertise threshold is dynamically updated by the machine learning model based on performances associated with the plurality of tasks (block 1030). For example, the artificial intelligence task management system (e.g., using computing resource 625, processor 720, and/or the like) may determine, using the performance parameter as an input to the machine learning model, whether the level of expertise of the user satisfies an expertise threshold, as described above. In some implementations, the expertise threshold is dynamically updated by the machine learning model based on performances associated with the plurality of tasks.

As further shown in FIG. 10, process 1000 may include obtaining a configuration update to the artificial intelligence module from the user (block 1035). For example, the artificial intelligence task management system (e.g., using computing resource 625, processor 720, input component 750, communication interface 770, and/or the like) may obtain a configuration update to the artificial intelligence module from the user, as described above.

As further shown in FIG. 10, process 1000 may include determining that the level of expertise of the user satisfies the expertise threshold (block 1040). For example, the artificial intelligence task management system (e.g., using computing resource 625, processor 720, and/or the like) may determine that the level of expertise of the user satisfies the expertise threshold, as described above.

As further shown in FIG. 10, process 1000 may include updating the artificial intelligence module to use the configuration update in association with training one or more users or selecting a subsequent set of tasks from the plurality of tasks based on determining that the level of expertise of the user satisfies the expertise threshold (block 1045). For example, the artificial intelligence task management system (e.g., using computing resource 625, processor 720, output component 760, communication interface 770, and/or the like) may update the artificial intelligence module to use the configuration update in association with training one or more users or selecting a subsequent set of tasks from the plurality of tasks based on determining that the level of expertise of the user satisfies the expertise threshold, as described above.

Process 1000 may include additional implementations, such as any single implementation or any combination of implementations described below and/or in connection with one or more other processes described elsewhere herein.

In some implementations, the artificial intelligence task management system may select, using the artificial intelligence module, training material to provide to the user to train the user; provide the training material to the user; monitor a training parameter associated with the user training with the training material; identify a second machine learning model to determine whether the user has a level of training; determine, using the training parameter as an input to the second machine learning model, whether the level of training of the user satisfies a training threshold; and select the set of tasks from the plurality of tasks based on determining that the level of training of the user satisfies the training threshold. In some implementations, the set of tasks are associated with a same topic as the training material.

In some implementations, the performance parameter associated with performing the set of tasks includes at least one of: a biometric of the user; timeliness to complete the set of tasks; speed while performing the set of tasks; a level of accuracy associated with performing the set of tasks; efficiency associated with performing the set of tasks; or a level of difficulty associated with the set of tasks. In some implementations, the performance parameter is determined from information received from at least one of: a camera monitoring the user; a user interface that receives user input associated with performing the set of tasks; or a sensor device monitoring the user.

In some implementations, the artificial intelligence module includes the machine learning model. In some implementations, the artificial intelligence module is configured to select the set of tasks from the plurality of tasks based on the level of expertise of the user determined using the machine learning model.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Accordingly, as described herein, an artificial intelligence task management system is provided that enables an artificial intelligence module to automatically be updated according to user feedback and/or manually by the user based on the user having a particular level of expertise. Accordingly, the artificial intelligence task management system facilitates adaptability and may only be reconfigured according to instructions that meet a particular threshold (e.g., instructions that are received from users that have a threshold level of expertise). As such, some implementations described herein may conserve processing resources and/or memory resources associated with adapting an artificial intelligence module using trusted information and/or adequate feedback from the user to prevent the artificial intelligence module from wasting the processing resources and/or memory resources with an outdated configuration or unadaptable configuration.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

identifying, by a device, a first artificial intelligence module to train a user;

selecting, by the device, using the first artificial intelligence module, a first set of tasks from a plurality of tasks to provide to the user;

providing, by the device, the first set of tasks to the user;

monitoring, by the device, based on first data received from one or more monitoring devices, and based on second data received from a user interface associated with the first set of tasks, a plurality of performance parameters associated with the user performing the first set of tasks, wherein the one or more monitoring devices include at least one of:
a sensor device,
an internet of things device,
a camera device,
a microphone device, or
a biometrics monitoring device;

performing, by the device and using the first artificial intelligence module, one or more actions according to user behavior,
wherein the one or more actions include providing a notification to the user when the user is taking too much time on a task of the first set of tasks;

identifying, by the device, a machine learning model to determine a level of expertise of the user;

determining, by the device and using the plurality of performance parameters as inputs to the machine learning model, that the level of expertise of the user does not satisfy an expertise threshold;

selecting, by the device, using the first artificial intelligence module and based on determining that the level of expertise of the user does not satisfy the expertise threshold, a second set of tasks, that is different from the first set of tasks, from the plurality of tasks to provide to the user;

providing, by the device, the second set of tasks to the user;

monitoring, by the device, the plurality of performance parameters associated with the user performing the second set of tasks;

determining, by the device and using the plurality of performance parameters as input to the machine learning model, that the level of expertise of the user satisfies the expertise threshold;

transitioning, by the device and based on the level of expertise of the user satisfying the expertise threshold, a role of the user from learning via the device to providing feedback to the device;

obtaining, by the device and based on the feedback, a configuration update from the user, to update the first artificial intelligence module;

updating, by the device, based on the level of expertise of the user satisfying the expertise threshold, and using the configuration update, the first artificial intelligence module, wherein the updated first artificial intelligence module is associated with training one or more other users or selecting a subsequent set of tasks from the plurality of tasks;

identifying, by the device and based on determining that the level of expertise of the user satisfies the expertise threshold, a second artificial intelligence module to train the user;

selecting, by the device and using the second artificial intelligence module, a third set of tasks from the plurality of tasks to provide to the user; and providing, by the device, the third set of tasks to the user.

2. The method of claim 1, further comprising:

monitoring the plurality of performance parameters when the user performs the third set of tasks;

determining, using the plurality of performance parameters when the user performs the third set of tasks as inputs to the machine learning model, that the level of expertise of the user satisfies the expertise threshold;

based on determining that the level of expertise of the user satisfies the expertise threshold, identifying a third artificial intelligence module to train the user;

selecting, using the third artificial intelligence module, a fourth set of tasks from the plurality of tasks to provide to the user; and providing the fourth set of tasks to the user.

3. The method of claim 1, wherein the machine learning model includes a knowledge graph model.

4. The method of claim 1, wherein the plurality of performance parameters associated with performing the first set of tasks or the second set of tasks includes a biometric of the user and at least one of:

a timeliness indicator associated with performing the first set of tasks or the second set of tasks;

a speed indicator associated with performing the first set of tasks or the second set of tasks;

a level of accuracy associated with performing the first set of tasks or the second set of tasks;

an efficiency indicator associated with performing the first set of tasks or the second set of tasks; or a level of difficulty associated with the first set of tasks or the second set of tasks.

5. The method of claim 1, wherein providing the third set of tasks to the user comprises displaying visual information associated with the third set of tasks on a display of a user interface.

6. The method of claim 1, wherein the machine learning model is a first machine learning model, the method further comprising:

selecting, using the artificial intelligence module, training material to provide to the user to train the user;

providing the training material to the user;

monitoring a plurality of training parameters associated with the user training with the training material;

identifying a second machine learning model to determine whether the user has a level of training;

determining, using the plurality of training parameters as inputs to the second machine learning model, whether the level of training of the user satisfies a training threshold; and selecting the first set of tasks from the plurality of tasks based on determining that the level of training of the user satisfies the training threshold, wherein the first set of tasks and second set of tasks are associated with a same topic as the training material.

7. A device, comprising:

one or more memories; and one or more processors, communicatively coupled to the one or more memories, configured to:
identify an artificial intelligence module to train a user;
select, using the artificial intelligence module, a set of tasks from a plurality of tasks to provide to the user;
provide the set of tasks to the user;
monitor, based on first data received from one or more monitoring devices, and based on second data received from a user interface associated with the set of tasks, a performance metric associated with the user performing the set of tasks,
wherein the one or more monitoring devices include at least one of:
a sensor device,
an internet of things device,
a camera device,
a microphone device, or
a biometrics monitoring device;
perform, using the artificial intelligence module, one or more actions according to user behavior,
wherein the one or more actions include providing a notification to the user when the user is taking too much time on a task of the set of tasks;
identify a machine learning model to determine a level of expertise of the user;
determine, using a biometric and the performance metric as inputs to the machine learning model, whether the level of expertise of the user satisfies an expertise threshold;
transition, based on the level of expertise of the user satisfying the expertise threshold, a role of the user from learning via the device to providing feedback to the device;
obtain, based on the feedback, a configuration update from the user to update the artificial intelligence module; and
update, based on the level of expertise of the user satisfying the expertise threshold, and using the configuration update, the artificial intelligence module,
wherein the updated artificial intelligence module is associated with training one or more other users or selecting a subsequent set of tasks from the plurality of tasks.

8. The device of claim 7, wherein the biometric of the user comprises at least one of:
an alertness level of the user;
a stress level of the user; or
a concentration level of the user.

9. The device of claim 7, wherein the performance metric includes at least one of:
a timeliness indicator associated with performing the set of tasks;
a speed indicator associated with performing the set of tasks;
a level of accuracy at which the user performs the set of tasks;
an efficiency indicator associated with performing the set of tasks; or
a level of difficulty associated with performing the set of tasks.

10. The device of claim 7, wherein the one or more processors are to:
determine that the level of expertise of the user satisfies the expertise threshold based on the performance metric indicating to the machine learning model that the user performed the set of tasks at a threshold speed, at a threshold level of accuracy, or with a threshold efficiency and that the set of tasks were associated with a threshold level of difficulty.

11. The device of claim 7, wherein, when the level of expertise of the user does not satisfy the expertise threshold, the artificial intelligence module is not updated to use the configuration update in association with training the one or more users or selecting the subsequent set of tasks from the plurality of tasks.

12. The device of claim 7, wherein the artificial intelligence module is configured specifically for the user.

13. The device of claim 7, wherein the set of tasks comprises an activity or operation associated with a term of employment or education.

14. A non-transitory computer-readable medium storing instructions, the instructions comprising:
one or more instructions that, when executed by one or more processors, cause the one or more processors to:
identify an artificial intelligence module to train a user;
select, using the artificial intelligence module, a set of tasks from a plurality of tasks to provide to the user;
provide the set of tasks to the user;
monitor, based on first data received from one or more monitoring devices and based on second data received from a user interface associated with the set of tasks, a performance parameter associated with the user performing the tasks,
wherein the one or more monitoring devices include at least one of:
a sensor device,
an internet of things device,
a camera device,
a microphone device, or
a biometrics monitoring device;
perform, using the artificial intelligence module, one or more actions according to user behavior,
wherein the one or more actions include providing a notification to the user when the user is taking too much time on a task of the set of tasks;
identify a machine learning model to determine a level of expertise of the user;
determine, using the performance parameter as an input to the machine learning model, whether the level of expertise of the user satisfies an expertise threshold,
wherein the expertise threshold is dynamically updated by the machine learning model based on performances associated with the plurality of tasks;
transition, based on the level of expertise of the user satisfying the expertise threshold, a role of the user from learning via the device to providing feedback to the device;
obtain, based on the feedback, a configuration update from the user to update the artificial intelligence module; and
update, based on the level of expertise of the user satisfying the expertise threshold, and using the configuration update, the artificial intelligence module,
wherein the updated artificial intelligence module is associated with training one or more other users or selecting a subsequent set of tasks from the plurality of tasks.

15. The non-transitory computer-readable medium of claim 14, wherein the one or more instructions, when executed by the one or more processors, further cause the one or more processors to:

select, using the artificial intelligence module, training material to provide to the user to train the user;
provide the training material to the user;
monitor a training parameter associated with the user training with the training material;
identify a second machine learning model to determine whether the user has a level of training;
determine, using the training parameter as an input to the second machine learning model, whether the level of training of the user satisfies a training threshold; and
select the set of tasks from the plurality of tasks based on determining that the level of training of the user satisfies the training threshold,
wherein the set of tasks are associated with a same topic as the training material.

16. The non-transitory computer-readable medium of claim 14, wherein the performance parameter associated with performing the set of tasks includes at least one of:
a biometric of the user;
a timeliness indicator associated with performing the set of tasks;
a speed indicator associated with performing the set of tasks;
a level of accuracy associated with performing the set of tasks;
an efficiency indicator associated with performing the set of tasks; or
a level of difficulty associated with the set of tasks.

17. The non-transitory computer-readable medium of claim 14, wherein the performance parameter is determined from information received from at least one of:
a camera monitoring the user;
a user interface that receives user input associated with performing the set of tasks; or
a sensor device monitoring the user.

18. The non-transitory computer-readable medium of claim 14, wherein the artificial intelligence module includes the machine learning model.

19. The non-transitory computer-readable medium of claim 14, wherein the artificial intelligence module is configured to select the set of tasks from the plurality of tasks based on the level of expertise of the user determined using the machine learning model.

20. The method of claim 4, wherein the biometric of the user comprises at least one of:
an alertness level of the user;
a stress level of the user; or
a concentration level of the user.

* * * * *